(12) United States Patent
Wend et al.

(10) Patent No.: US 9,027,734 B2
(45) Date of Patent: May 12, 2015

(54) BUFFER SECTION FOR A CONVEYING SYSTEM AND CONVEYING SYSTEM OF THIS TYPE

(71) Applicant: Dürkopp Fördertechnik GmbH, Bielefeld (DE)

(72) Inventors: Michael Wend, Bielefeld (DE); Andreas Schwan, Bielefeld (DE); Thomas Johannesmann, Bielefeld (DE)

(73) Assignee: Duerkopp Foerdertechnik GmbH, Bielefeld (DE)

( * ) Notice: Subject to any disclaimer, the term of this patent is extended or adjusted under 35 U.S.C. 154(b) by 99 days.

(21) Appl. No.: 13/845,419

(22) Filed: Mar. 18, 2013

(65) Prior Publication Data
US 2013/0264171 A1 Oct. 10, 2013

(30) Foreign Application Priority Data

Apr. 5, 2012 (DE) .......................... 10 2012 205 735

(51) Int. Cl.
| | |
|---|---|
| *B65G 47/29* | (2006.01) |
| *B65G 57/20* | (2006.01) |
| *B65G 19/02* | (2006.01) |
| *B65G 47/61* | (2006.01) |
| *B65G 47/88* | (2006.01) |

(52) U.S. Cl.
CPC .............. *B65G 47/29* (2013.01); *B65G 19/025* (2013.01); *B65G 47/61* (2013.01); *B65G 47/8823* (2013.01); *B65G 2201/0229* (2013.01)

(58) Field of Classification Search
None
See application file for complete search history.

(56) References Cited

U.S. PATENT DOCUMENTS

| | | | |
|---|---|---|---|
| 3,799,394 A | | 3/1974 | Hemard |
| 4,878,336 A | * | 11/1989 | Kohler ........................... 53/500 |
| 6,439,366 B1 | | 8/2002 | Matkovich |

FOREIGN PATENT DOCUMENTS

| | | |
|---|---|---|
| DE | 8433582 U1 | 2/1985 |
| DE | 3737484 A1 | 5/1989 |
| DE | 4010231 A1 | 10/1991 |
| DE | 4028388 A1 | 3/1992 |
| DE | 9302371 U1 | 7/1993 |
| DE | 29804038 U1 | 7/1998 |
| EP | 0700849 A1 | 3/1996 |
| EP | 2130789 A1 | 12/2009 |

OTHER PUBLICATIONS

European Search Report of EP13158288 dated Jun. 27, 2013.

* cited by examiner

*Primary Examiner* — Kavel Singh
(74) *Attorney, Agent, or Firm* — Browdy and Neimark, PLLC

(57) ABSTRACT

A buffer section for a conveying system in a high rack warehouse comprises a slide rod inclined relative to the horizontal for sliding conveyance along a conveying path in a conveying direction, which is parallel to a slide rod longitudinal axis, of a plurality of suspended conveyed goods, which are in each case suspended by means of a hook on the slide rod, and a stopper element in the conveying path at the end of at least one portion of the slide rod to stop the conveyed goods with the formation of a group of conveyed goods, wherein the stopper element has a contact face, which can be displaced between a stopper arrangement to stop the conveyed goods and a passing arrangement for allowing the conveyed goods through, for the conveyed goods, and wherein exclusively the stopper element is used to stop the conveyed goods.

25 Claims, 1 Drawing Sheet

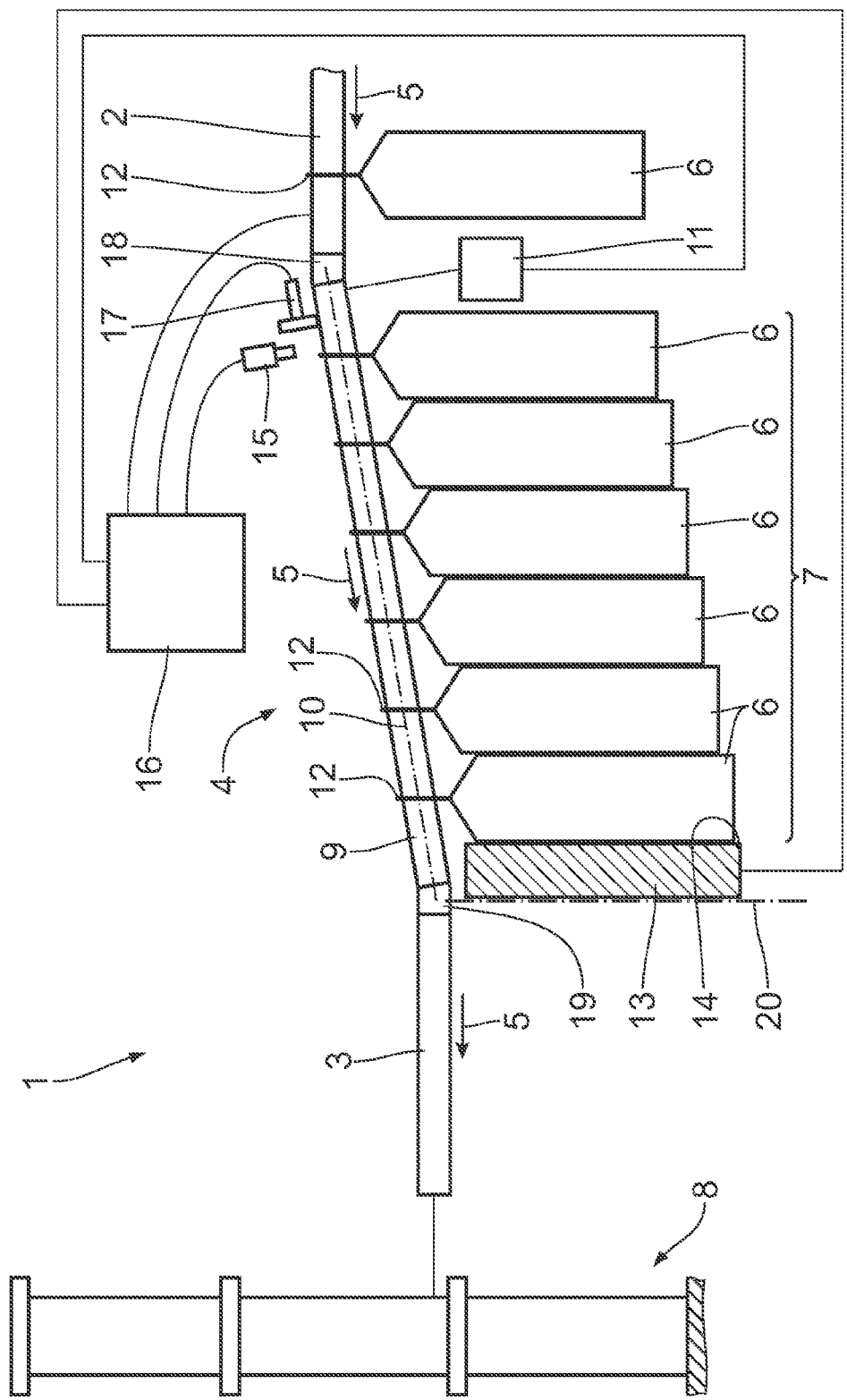

BUFFER SECTION FOR A CONVEYING SYSTEM AND CONVEYING SYSTEM OF THIS TYPE

CROSS-REFERENCES TO RELATED APPLICATIONS

This application claims the priority of German Patent Application, Serial No. 10 2012 205 735.8, filed Apr. 5, 2012, pursuant to 35 U.S.C. 119(a)-(d), the content of which is incorporated herein by reference in its entirety as if fully set forth herein.

FIELD OF THE INVENTION

The invention relates to a buffer section for a conveying system in a high rack warehouse and a conveying system of this type.

BACKGROUND OF THE INVENTION

Conveying systems for handling conveyed goods are known from DE 40 28 388 A1 and from U.S. Pat. No. 6,439,366 B1.

A system for loading and unloading high racks with suspended conveyed goods is known from EP 2 130 789 A1. The conveyed goods are suspended by means of a hook, for example a hanger, on a conveying rail and are conveyed in the conveying system. Before the conveyed goods are transferred into the loading and unloading station, a group of conveyed goods, which comprises a plurality of conveyed goods, is provided by means of a so-called buffer section, which is configured as an inclined rod. When there is a large incline of the rod and there are particularly heavy conveyed goods, the latter can be compressed, in other words closely packed together. When the group of conveyed goods is removed from the buffer section, the close packing is eliminated and an increased space requirement is produced as the conveyed goods are no longer compressed. When there is a small slope of the rod, there is a danger of the conveyed goods not being reliably conveyed. In order to allow a backing-up of the conveyed goods in the buffer section, a stopper element is provided in the form of a bar on the rod, which bar holds up the hook and prevents it from sliding further along the rod. Because of their own weight, the conveyed goods pivot about the bar on the rod. A substantially fan-like arrangement of the individual conveyed goods is produced, their hooks resting on one another in the region of the bar and their lower ends remote from the rod being fanned out, in other words, in particular spaced apart to a maximum extent. The handling of conveyed goods grouped in this manner is laborious and complicated.

A device with a slide rod is known from DE 40 10 231 A1. A separating mechanism is provided on the slide rod by means of a contact fastened to the slide rod in order to hold up the clothes hangers sliding along the slide rod. In addition, a barrier may be provided to avoid the clothing items swinging on the contact. A device of this type is laborious and comprises a large number of components, which, in particular, have to be activated separately. The configuration and handling of a device of this type is complex and expensive.

SUMMARY OF THE INVENTION

The invention is based on an object of providing a buffer section for a conveying system in a high rack warehouse, which allows an automatic and reliable grouping of a plurality of, in other words at least two, conveyed goods to form a group of conveyed goods, a parallel, in particular vertical, arrangement of the conveyed goods, in particular, being ensured within the group of conveyed goods.

This object is achieved according to the invention by a buffer section for a conveying system in a high rack warehouse, wherein the buffer section comprises a) a slide rod inclined relative to the horizontal for sliding conveyance along a conveying path in a conveying direction, which is parallel to a slide rod longitudinal axis, of a plurality of suspended conveyed goods, which are in each case suspended by means of a hook on the slide rod, and b) a stopper element in the conveying path at the end of at least one portion of the slide rod to stop the conveyed goods with the formation of a group of conveyed goods, wherein the stopper element has a contact face, which can be displaced between a stopper arrangement to stop the conveyed goods and a passing arrangement for allowing the conveyed goods through, for the conveyed goods, and wherein exclusively the stopper element is used to stop the conveyed goods.

It was recognized according to the invention that by means of a stopper element having a contact face, conveyed goods can advantageously be backed up parallel to one another and, in particular, suspended vertically. The stopper element is displaceable between a stopper arrangement and a passing arrangement. In the stopper arrangement, the stopper element is arranged along a conveying direction, so the conveyed goods are prevented from displacing along the conveying direction past the stopper element. In the stopper arrangement, the stopper element is used to stop the conveyed goods. The stopper element is in a closed position. In the passing arrangement, the stopper element is removed from the conveying section, in other words not arranged in a conveying path along the conveying direction. The conveyed goods can, in the passing arrangement, pass the stopper element arranged, in particular, laterally next to the buffer section. The stopper element is in an opened position. In the passing arrangement, the stopper element is used to allow the conveyed goods through. In particular, the contact face is arranged at least in a lower region of the conveyed goods. As a result, the possibility of the conveyed goods being unintentionally arranged crookedly along the buffer section is ruled out. The lower region of the conveyed goods are taken, in particular, to mean a surface region, which, proceeding from a lower end of the conveyed goods, extends over at least 30%, in particular at least 40% and, in particular at least 50%, of a height of the conveyed goods. The contact face can, however, also extend over the entire region of the conveyed goods. The slide rod is inclined relative to the horizontal along the buffer section and allows a sliding conveyance of the suspended conveyed goods along a conveying path. The stopper element is arranged in the conveying path at the end, at least of a portion of the slide rod. The conveyed goods are suspended by means of a hook, for example a hanger, on the slide rod. In particular, the conveyed goods are clothing or another product. The conveyed goods, in other words at least two, are backed up along the buffer section to form a group of conveyed goods. The group of conveyed goods is also called a block. Since exclusively the stopper element is used to stop the conveyed goods, the structure of the buffer section overall is simplified. In particular, it is not necessary to provide a plurality of components to reliably guarantee a stopping of the conveyed goods. The structure of the buffer section is, in particular, simplified compared to the device known from DE 40 10 231 A1. The handling of the buffer section is simplified.

In particular, it is sufficient to only actuate a single stopper element in order to ensure the stopping of the conveyed goods.

A buffer section, in which the contact face in the stopper arrangement is oriented transverse to the conveying direction, in particular the contact face is oriented vertically, allows an improved abutment of the conveyed goods on the stopper element. The stopper function is improved. In particular, a vertical arrangement of the stopper element allows an advantageous provision of the conveyed goods suspended vertically.

A buffer section, in which the stopper element is a door, which is pivotable about a pivot axis that is, in particular, vertically oriented, simplifies the displacement of the stopper element between the stopping arrangement and the passing arrangement. It is possible for the stopper element to be configured as a single-leaf door, which can be pivoted laterally. It is also possible to provide a two-leaf door, the two leaves preferably being configured identically. The space requirement for the pivoting is reduced. The pivoting axis may, in particular, be vertically oriented and be arranged laterally next to the buffer section. It is also possible for the pivot axis to be oriented horizontally and perpendicular to the conveying direction. It is also conceivable to provide a one-part or two-part sliding door as the stopper element. With a sliding door, the space requirement is additionally reduced, in particular along the conveying direction.

In a buffer section, in which the stopper element is arranged spaced apart from the slide rod, the stopper element is not arranged directly on the slide rod, for example as a bar. The stopper element comes into contact with the conveyed goods in the region of a lower end and, in particular, not in the region of the hook. The stopping of the conveyed goods is thus not ensured by a stopping of the hook on the rod but by a flat abutment of the conveyed goods on the contact face. The spacing of the stopper element from the slide rod can be selected in adaptation to the respective conveyed goods to be conveyed. If conveyed goods with different dimensions, for example smaller suspended clothing items and longer suspended ones, are conveyed, the stopper element has at least one stopper region which is adjacent to the slide rod.

A buffer section comprising a drive element for driving the slide rod has an improved conveying function. A drive element is provided to drive the slide rod. Since the slide rod is inclined, an automatic sliding of the conveyed goods is promoted.

A buffer section, in which the drive element acts in such a way that a coefficient of friction between the slide rod and the conveyed goods is reduced, wherein the drive element in particular is configured as a rotary drive or as an oscillating drive, leads to an improved conveyance of the conveyed goods along the slide rod. Since the conveyed goods slip or slide along the driven slide rod, sliding friction and not static friction is provided. The coefficient of sliding friction is generally less than the coefficient of static friction, so the drive element thus favors a sliding of the conveyed goods on the rod and therefore the reduction in the coefficient of friction. The drive element may, for example, be configured as a rotary drive or as an oscillating drive and allows an uncomplicated and simple configuration of the drive element.

A buffer section, in which the stopper element is locked, in particular mechanically, in the stopper arrangement, allows a reliable stopping of the conveyed goods. The buffer section is robust and, in particular permanently loadable. Since the stopper element is locked in the stopper arrangement, in particular mechanically, a reliable stopping condition for the conveyed goods is ensured. In particular due to the continuous operation to be expected of a buffer section of this type, a mechanical locking, due to a high mechanical loadability, makes advantages possible compared to other, non-mechanical locks.

A buffer section comprising a measuring unit for measuring the length of the group of conveyed goods along the slide rod longitudinal axis ensures the monitoring of a length of the group of conveyed goods along the slide rod longitudinal axis. It is thereby possible for groups of conveyed goods of identical length to be provided. It is thus possible for the capacity of the high rack warehouse to be able to be very well utilized in that every group of conveyed goods uses an allotted storage space to capacity.

In a buffer section, in which the measuring unit has a counting unit to count the number of conveyed goods per group of conveyed goods, the measuring unit has a counting unit to count the conveyed goods. In this case, a group of conveyed goods can exclusively have identical conveyed goods but also have different conveyed goods.

In a buffer section, in which the measuring unit has an identifying unit to identify the conveyed goods, the measuring unit additionally has an identifier unit, which, in particular, has a signal connection to a control mechanism. It is thus possible, by identifying the conveyed goods, to directly detect data about the conveyed goods, in particular their dimensions or individual length along the slide rod longitudinal axis.

In a buffer section, in which the measuring unit has a sensor being in signal connection to a control unit to detect a length of the group of products, the measuring unit exclusively has, in particular, one sensor, which detects the situation or position of the conveyed goods on the slide rod. Alternatively, a configuration of the measuring unit is also possible with two or more sensors, which, for example, have various measuring regions along a conveying path of the conveyed goods.

A buffer section, in which an angle of inclination is between 2° and 20°, in particular between 2° and 16°, in particular between 5° and 15° and in particular between 8° and 12°, has a particularly suitable angle of inclination of the slide rod, which is small enough for the conveyed goods to not be closely packed, and which is large enough for a sliding of the conveyed goods along the slide rod to be ensured. If a driving of the slide rod is provided, the angle of incline can be selected to be comparatively small as the drive favors the conveying behavior. It is advantageous if the individual conveyed goods rest on one another and, in particular, closely on one another. For this purpose, a contact pressure is advantageous. However, the contact pressure should not lead to a compression of the conveyed goods, as otherwise the block would expand once the contact pressure is no longer applied. Storage in the high rack warehouse would then no longer be readily possible. In particular, the space requirement in the high rack would hardly be predictable. The contact pressure of the products, on the one hand, depends on the slope of the slide rod and, on the other hand, on the dimensions of the individual products. An excess contact pressure can be avoided with the present buffer section. A slightly inclined slide rod is not problematical, as the risk of the products not sliding because of the small slope and the conveying function of the buffer section being impaired is eliminated by the use of the drive element to drive the slide rod.

A buffer section, in which the stopper element in the stopper arrangement has a closing force oriented counter to the conveying direction of at least 80 N, in particular at least 100 N and in particular in a range from 100 N to 150 N, allows the conveyed goods to be stopped with a defined closing force. For this purpose, the stopper element in the stopper arrangement has a closing force oriented counter to the conveying direction of at least 80 N, in particular at least 100 N and, in particular, in the range from 100 N to 150 N.

A conveying system for suspended conveyed goods in a high rack warehouse with a) a buffer section according to any one of the preceding claims,
b) a feed rod connected to the slide rod to feed the conveyed goods and
c) a discharge rod connected to the slide rod to discharge the conveyed goods backed up within the buffer section to form a group of conveyed goods comprises a buffer section according to the invention. The advantages of the conveying system correspond to those of the buffer section, to which reference is hereby made.

A conveying system comprising a catch unit to catch the group of conveyed goods from the slide rod of the buffer section to the discharge rod allows an improved onward transportation of the conveyed goods from the slide rod of the buffer section to the discharge rod.

Further advantages, features and details of the invention emerge from the following description of an embodiment with the aid of the drawing.

BRIEF DESCRIPTION OF THE DRAWING

FIG. 1 shows a simplified, schematic side view of a conveying system with a buffer section according to the invention.

DESCRIPTION OF THE PREFERRED EMBODIMENT

The conveying system 1 shown in FIG. 1 comprises a feed rod 2, a discharge rod 3 and a buffer section 4 arranged between the feed rod 2 and the discharge rod 3. A conveying direction 5 is in each case oriented parallel to the rods 2, 3 or the buffer section 4. The feed rod 2 is used to feed suspended conveyed goods 6. The conveyed goods 6 are arranged along the buffer section 4 to form a group 7 of conveyed goods. The group 7 of conveyed goods is also called a block. The forming of a block within the buffer section 4 takes place automatically. It is simultaneously ensured that each block has an identical length along the conveying direction 5. The block is discharged to the discharge rod 3. The block is then transported from the discharge rod 3 into a high rack 8 and stored there. This may, for example, take place, as in EP 2 130 789 A1, in that the block is autonomously stored in the high rack 8 by means of a bay servicing apparatus. It is also possible for the block to be stored in the high rack 8 in a different manner.

The structure of the buffer section 4 will be described in more detail below. The buffer section 4 comprises a slide rod 9, which is inclined relative to the horizontal and has a slide rod longitudinal axis 10. The angle of inclination of the slide rod relative to the horizontal is between 2° and 20°, in particular between 2° and 16°, in particular between 5° and 15° and, in particular, between 8° and 12°. The slide rod 9 has a smooth cylindrical lateral surface. It is alternatively conceivable for the slide rod 9 to be configured as a spindle with an external thread. The conveyed goods 6, which is clothing, are suspended by means of a hook 12 of a hanger on the slide rod 9. The conveyed goods 6 are generally also called products. The clothing is conveyed while suspended along the conveying system 1. The conveying direction 5 is parallel to the slide rod longitudinal axis 10 in the region of the buffer section 4. The conveying direction 5, in the region of the feed rod 2 and in the region of the discharge rod 3, is, in each case, parallel to the rod longitudinal axes thereof. This means that the conveying direction 5 can be differently oriented in regions.

Furthermore, the buffer section 4 comprises a drive element 11 in the form of a rotary drive. The drive element 11 is connected to the slide rod 9 and is used to drive the slide rod 9. The drive element 11 thus brings about a rotation of the slide rod 9 about the slide rod longitudinal axis 10, so friction between the slide rod 9 and the hanger 12 is reduced. This applies both to the smooth surface of the slide rod 9 and to the configuration, not shown, in the form of the spindle. Alternatively, the drive element can also be configured as an oscillating drive.

The buffer section 4 furthermore comprises a stopper element 13, which is arranged along the conveying direction 5 at one end of the buffer section 4. The stopper element 13 is used to stop the at least one conveyed product 6, so the group 7 of products can be formed. The stopper element 13 is configured as a door, which can be pivoted about a vertical pivot axis 20 and is pivotable between a closed position, a so-called stopper arrangement, and an opened position, a so-called passing arrangement. According to FIG. 1, the door is shown over the entire area, i.e. its height in the vertical direction corresponds substantially to the height of the conveyed goods 6. It is also possible and not a hindrance, in particular for the contact function of the door 13 if the door 13 has a reduced height of, for example, at most 70%, in particular at most 60% and, in particular, at most 50%, of the height of the conveyed goods.

In the view in FIG. 1, the door 13 is arranged in the closed position, this means that the conveyed goods 6 are prevented from further conveyance along the conveying direction 5 and are held up on the door 13. By pivoting the door, in particular about a vertically oriented pivot axis 20, the door is transferred into the open position, so the group 7 of conveyed goods can be conveyed from the buffer section 4 to the discharge rod 3. It is also conceivable for the door 13 to be a sliding door, which can be slid between an opened and a closed position. In each case, the door 13 has a contact face 14 for the conveyed goods 6, at least in a lower region of the conveyed goods 6 remote from the slide rod 9. As a result, it is ensured that the conveyed goods 6 rest flat on the door 13 and are arranged parallel to one another and, in particular, vertically. As a result, an ordered, parallel arrangement of the conveyed goods 6 along the conveying direction 5 is ensured. In particular, it can be ruled out that the conveyed goods 6, because of a bar-like stopper element, which is directly attached to the slide rod 9, with a punctiform or linear abutment pivot about this bar and a non-parallel arrangement of the conveyed goods 6 is the result. The door 13 is oriented vertically.

For an optimal utilization of the space or storage capacity provided by the high rack 8, it is advantageous if the groups 7 of conveyed goods always have identical lengths along the slide rod longitudinal axis 10. For this purpose, a measuring unit 15 in the form of a sensor 15 is provided. The sensor 15 is arranged with respect to the slide rod 9 in such a way that the sensor detects when a maximally permissible length of the group 7 of conveyed goods is reached. The sensor is connected to a control unit 16, which is in turn connected to the feed rod 2 and a driver unit 17. The control unit 16 is also connected to the drive element 11.

As soon as the sensor detects the maximally permissible length of the group 7 of conveyed goods, a corresponding signal is transmitted to the control unit 16. A signal then goes from the control unit 16 to the feed rod 2, so no further conveyed goods 6 are conveyed into the buffer section 4, and optionally to the drive element 11, so the drive of the slide rod 9 can be switched off.

The control unit 16 is furthermore connected to the stopper element. When the maximally permissible length of the group 7 of conveyed goods is reached, the control unit 16 transmits a corresponding signal to the stopper element 13, so the latter is displaced into the opened position. The group 7 of conveyed goods is then caught by a catch unit 17 from the slide rod 9 of the buffer section 4 to the discharge rod 3. The catch unit 17 ensures that the group 7 of conveyed goods is reliably and safely pushed from the slide rod 9. The catch unit 17 may, for example, be configured by a slider that can be displaced along the conveying direction 5.

The sensor of the measuring unit 15 detects the maximally permissible length of the group 7 of conveyed goods, in particular contactlessly, for example optically. It is also possible, as an alternative to the sensor, to provide on the measuring unit 15 a counting unit to count the number of conveyed goods 6 per group 7 of conveyed goods. If exclusively identically configured conveyed goods 6 are arranged within the buffer section to form a group 7 of conveyed goods, the maximally permissible length of the group 7 of conveyed goods can be replaced by a maximally permissible number of conveyed goods 6. As the respective length along the conveying direction 5 of the identical conveyed goods 6 is known, a direct conversion of the maximally permissible length of the group 7 of conveyed goods to the to the maximally permissible number of conveyed goods 6 is possible in a direct and uncomplicated manner. To determine the length of the group 7 of conveyed goods, it is only necessary to count the conveyed goods 6. This leads to a simplification of the method and, in particular, to the simplification of the system technology. A counting sensor is more simply constructed and more economical than a length measuring sensor. If a plurality of different conveyed goods 6 is to be backed up within the buffer section 4, apart from the counting unit, an identification unit is also necessary to identify the respective conveyed goods 6. This identification unit, just like the counting unit, is connected to the control unit 16, a respective length of identified conveyed goods being stored in a database for example in an integrated memory in the control unit 16. The respective conveyed goods can also be identified in the run-up to the conveyance of the conveyed goods, in other words before the buffer section 4.

The feed rod 2 is connected by a first coupling 18 to the slide rod 9 of the buffer section 4. The discharge rod 3 is connected by a second coupling 19 to the slide rod 9 of the buffer section 4. The couplings 18, 19 are, in particular, necessary, as the slide rod 9 is driven and the supply rod 2 and the discharge rod 3 are stationarily arranged.

The stopper element 13 is used to stop the conveyed goods 6. The stopper element 13 is the only component which allows the stopping of the conveyed goods 6. This means that exclusively the stopper element 13 is used to stop the conveyed goods 6. It is, in particular, not necessary to provide further components and, in particular, a contact element, on the slide rod 9 in order to allow reliable stopping of the conveyed goods 6.

The exclusive use of the stopper element 13 is, in particular, made possible in that the stopper element 13 is locked in the stopper arrangement. This locking can, in particular, take place mechanically in that the stopper element 13 is, for example, pivoted against a stop. The stop is, in particular, arranged in such a way that an unintentional pivoting of the stopper element out of the stopper arrangement, for example as a result of a loading by the weight of conveyed goods themselves, which are stopped on the stopper element 13, is reliably ruled out. It is also conceivable to lock the stopper element 13, additionally or alternatively, for example electromagnetically, in other words contactlessly.

In the stopper arrangement, the stopper element has a closing force oriented counter to the conveying direction 5. In particular, it is possible for the closing force to be adjustable. The closing force is at least 80 N, in particular at least 100 N and is, in particular, in a range from 100 N to 150 N. This closing force is sufficient to reliably hold up the loads to be expected of conveyed goods 6, which slide along the slide rod 9 against the stopper element 13. At the same time, the closing force is such that it can be provided by means of an actuator. An actuator of this type may, for example, be a hydraulic or pneumatic cylinder. Electric motor actuators can also be used. A spindle drive is also conceivable.

What is claimed is:

1. A buffer section for a conveying system in a high rack warehouse, wherein the buffer section (4) comprises
    a) a slide rod (9) inclined relative to the horizontal for sliding conveyance along a conveying path in a conveying direction (5), which is parallel to a slide rod longitudinal axis (10), of a plurality of suspended conveyed goods (6), which are in each case suspended by means of a hook (12) on the slide rod (9), and
    b) a stopper element (13) in the conveying path at the end of at least one portion of the slide rod (9) to stop the conveyed goods (6) with the formation of a group (7) of conveyed goods,
    wherein the stopper element (13) has a contact face (14), which can be displaced between a stopper arrangement to stop the conveyed goods (6) and a passing arrangement for allowing the conveyed goods (6) through, for the conveyed goods (6), and wherein exclusively the stopper element (13) is used to stop the conveyed goods (6), such that the stopper element (13) comes into contact with the conveyed goods (6).

2. A buffer section according to claim 1, wherein the contact face (14) in the stopper 20 arrangement is oriented transverse to the conveying direction (5).

3. A buffer section according to claim 1, wherein the contact face (14) is oriented vertically.

4. A buffer section according to claim 1, wherein the stopper element (13) is a door, which is pivotable about a pivot axis (20).

5. A buffer section according to claim 4, wherein the pivot axis (20) is vertically oriented.

6. A buffer section according to claim 1, wherein the stopper element (13) is arranged spaced apart from the slide rod (9).

7. A buffer section according to claim 1, comprising a drive element (11) for driving the slide rod (9).

8. A buffer section according to claim 7, wherein the drive element (11) acts in such a way that a coefficient of friction between the slide rod (9) and the conveyed goods (6) is reduced.

9. A buffer section according to claim 7, wherein the drive element (11) is configured as one of a rotary drive and an oscillating drive.

10. A buffer section according to claim 1, wherein the stopper element (13) is locked in the stopper arrangement.

11. A buffer section according to claim 1, wherein the stopper element (13) is mechanically locked in the stopper arrangement.

12. A buffer section according to claim 1, comprising a measuring unit (15) for measuring the length of the group (7) of conveyed goods along the slide rod longitudinal axis (10).

13. A buffer section according to claim 12, wherein the measuring unit (15) has a counting unit to count the number of conveyed goods (6) per group (7) of conveyed goods.

14. A buffer section according to claim 12, wherein the measuring unit (15) has an identifying unit to identify the conveyed goods (6).

15. A buffer section according to claim 12, wherein the measuring unit (15) has a sensor being in signal connection to a control unit (16) to detect a length of the group (7) of products.

16. A buffer section according to claim 1, wherein an angle of inclination is between 2° and 20°.

17. A buffer section according to claim 1, wherein an angle of inclination is between 2° and 16°.

18. A buffer section according to claim 1, wherein an angle of inclination is between 5° and 15°.

19. A buffer section according to claim 1, wherein an angle of inclination is between 8° and 12°.

20. A buffer section according to claim 1, wherein the stopper element (13) in the stopper arrangement provides a closing force, wherein said closing force is oriented counter to the conveying direction (5) and wherein said closing force has an amount of at least 80 N.

21. A buffer section according to claim 1, wherein the stopper element (13) in the stopper arrangement provides a closing force, wherein said closing force is oriented counter to the conveying direction (5) and wherein said closing force has an amount of 100 N.

22. A buffer section according to claim 1, wherein the stopper element (13) in the stopper arrangement provides a closing force, wherein said closing force is oriented counter to the conveying direction (5), and wherein said closing force has an amount between 100 N to 150 N.

23. A conveying system for suspended conveyed goods (6) in a high rack warehouse with a) a buffer section (4) according to any one of the preceding claims, b) a feed rod (2) connected to the slide rod (9) to feed the conveyed goods (6) and c) a discharge rod (3) connected to the slide rod (9) to discharge the conveyed goods (6)
backed up within the buffer section (4) to form a group (7) of conveyed goods.

24. A conveying system according to claim 23, comprising a catch unit (17) to catch the group (7) of conveyed goods from the slide rod (9) of the buffer section (4) to the discharge rod (3).

25. A buffer section for a conveying system in a high rack warehouse, wherein the buffer section (4) comprises a) a slide rod (9) inclined relative to the horizontal for sliding conveyance along a conveying path in a conveying direction (5), which is parallel to a slide rod longitudinal axis (10), of a plurality of suspended conveyed goods (6), which are in each case suspended by means of a hook (12) on the slide rod (9), and b) a stopper element (13) in the conveying path at the end of at least one portion of the slide rod (9) to stop the conveyed goods (6) with the formation of a group (7) of conveyed goods, wherein the stopper element (13) has a contact face (14), which can be displaced between a stopper arrangement to stop the conveyed goods (6) and a passing arrangement for allowing the conveyed goods (6) through, for the conveyed goods (6), wherein said contact face (14) is arranged at least in a lower region of the conveyed goods (6), and wherein exclusively the stopper element (13) is used to stop the conveyed goods.

\* \* \* \* \*